US011736299B2

United States Patent
Cerna, Jr.

(10) Patent No.: US 11,736,299 B2
(45) Date of Patent: Aug. 22, 2023

(54) DATA ACCESS CONTROL FOR EDGE DEVICES USING A CRYPTOGRAPHIC HASH

(71) Applicant: Prometheus8, Inc., San Carlos, CA (US)

(72) Inventor: James J. Cerna, Jr., San Carlos, CA (US)

(73) Assignee: PROMETHEUS8, San Carlos, CA (US)

( * ) Notice: Subject to any disclaimer, the term of this patent is extended or adjusted under 35 U.S.C. 154(b) by 43 days.

(21) Appl. No.: 16/747,796

(22) Filed: Jan. 21, 2020

(65) Prior Publication Data

US 2020/0235935 A1 Jul. 23, 2020

Related U.S. Application Data

(60) Provisional application No. 62/794,406, filed on Jan. 18, 2019.

(51) Int. Cl.
*H04L 29/06* (2006.01)
*H04L 9/32* (2006.01)
*H04L 9/00* (2022.01)

(52) U.S. Cl.
CPC .............. *H04L 9/3236* (2013.01); *H04L 9/50* (2022.05)

(58) Field of Classification Search
CPC .. H04L 9/3236; H04L 2209/38; H04L 9/3239
See application file for complete search history.

(56) References Cited

U.S. PATENT DOCUMENTS

| | | | | |
|---|---|---|---|---|
| 6,915,344 B1* | 7/2005 | Rowe | ...................... | H04L 43/50 709/224 |
| 9,225,729 B1* | 12/2015 | Moen | .................. | H04L 63/0876 |
| 9,594,906 B1* | 3/2017 | Langton | ................ | G06F 21/564 |
| 9,934,138 B1* | 4/2018 | Bache | ................. | G06F 11/3688 |
| 11,271,945 B2 | 3/2022 | Rod | | |
| 2006/0294434 A1* | 12/2006 | Ikeda | .................. | G06F 11/3688 714/38.1 |
| 2011/0231862 A1* | 9/2011 | Walsh | ..................... | G06F 13/00 719/318 |
| 2015/0264080 A1* | 9/2015 | Bu | ...................... | H04L 63/1416 726/23 |
| 2015/0348081 A1* | 12/2015 | VanHoozer | .......... | G06Q 20/405 705/14.27 |

(Continued)

*Primary Examiner* — Taghi T Arani
*Assistant Examiner* — Lin Chang
(74) *Attorney, Agent, or Firm* — Knobbe, Martens, Olson & Bear, LLP

(57) ABSTRACT

Embodiments of network devices for access control are described. In some embodiments, an access control processor of a first node receives a request from a requestor node on an unsecure network to join a group of nodes on a secure network, where the first node coordinates network activities of the group of nodes including a plurality of partitioned nodes of a network. In response to receiving the request, the access control processor assigns the requestor node to a first pool of the group of nodes that are configured to perform authorized modifications of data including a cryptographic hash to protect the data against unauthorized modifications. In some embodiments, the nodes can perform test scripts based on characteristics of the node, the corresponding edge device, and/or the user.

17 Claims, 11 Drawing Sheets

(56) References Cited

U.S. PATENT DOCUMENTS

| | | | |
|---|---|---|---|
| 2016/0260098 A1* | 9/2016 | Landrock | G06Q 20/4016 |
| 2017/0347253 A1* | 11/2017 | Clawsie | H04W 4/50 |
| 2018/0365396 A1* | 12/2018 | Rucker | G06F 21/645 |
| 2019/0075448 A1* | 3/2019 | Prakash | H04W 24/00 |
| 2019/0268319 A1 | 8/2019 | Kurian | |
| 2019/0303623 A1* | 10/2019 | Reddy | G06F 8/71 |
| 2019/0306232 A1* | 10/2019 | Brock | H04W 4/70 |
| 2019/0347290 A1* | 11/2019 | Yang | G10H 1/0058 |
| 2020/0162546 A1 | 5/2020 | Juhlin | |

\* cited by examiner

DATA ACCESS CONTROL FOR EDGE DEVICES USING A CRYPTOGRAPHIC HASH

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

TECHNICAL FIELD

The present disclosure relates to data access control, and more particularly, to authorized modifications of data based on the data access control and testing scripts.

DESCRIPTION OF THE RELATED ART

Technological advances in blockchain technology and other distributed ledger technology have allowed for digital information to be securely distributed using secured cryptography. As blockchain technology continues to improve, transactions and other data modifications can occur more securely and quickly across millions of users. Blockchain technology strives to allow the data to be transparent and incorruptible without a singular point of failure or a centralized single controlling entity.

BRIEF DESCRIPTION OF THE DRAWINGS

The innovations described in the claims each have several aspects, no single one of which is solely responsible for its desirable attributes. Without limiting the scope of the claims, some prominent features of this disclosure will now be briefly described.

FIG. 2A illustrates an example of a software developer requesting to run a test script according to some embodiments of the present disclosure.

FIG. 2B illustrates an example of the 5$^{th}$ node receiving the request and the test scripts from the software developer according to some embodiments of the present disclosure.

FIG. 2C illustrates an example of the nodes executing the scripts to generate a hash according to some embodiments of the present disclosure.

FIG. 2D illustrates an example of the test results being sent to the software developer according to some embodiments of the present disclosure.

FIG. 2E illustrates an example of the software developer sending a transaction, such as a payment, to the nodes that executed the test script according to some embodiments of the present disclosure.

FIG. 3A illustrates an example of a software developer requesting to run a test script for device type 1 in a particular region according to some embodiments of the present disclosure.

FIG. 3B illustrates an example of the identification of nodes with edge devices corresponding to the desired device type for testing according to some embodiments of the present disclosure.

SUMMARY

Figure 1:
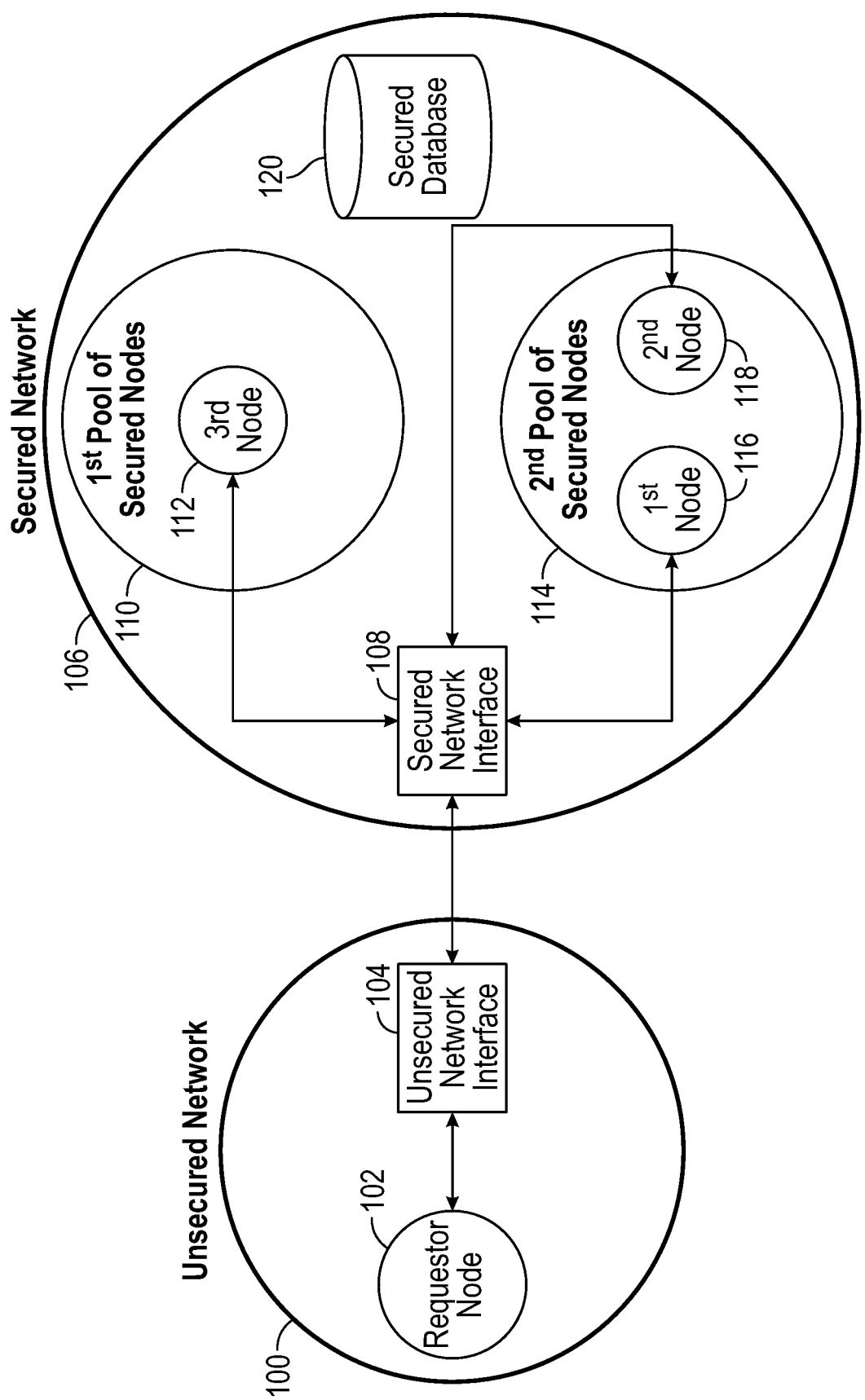
FIG. 1 is a block diagram illustrating an unsecured and secured network infrastructure according to some embodiments of the present disclosure.

Some embodiments include an access control method comprising: by at least one processor of a first node associated with a user device: via a network interface of an unsecured network, transmitting a request packet to a second node on a secured network to join a group of nodes of a plurality of partitioned nodes of a secured network; receiving, from the second node, an indication of being assigned to the group of nodes within the secured network using a secured network protocol, wherein one or more nodes of the group of nodes are configured to perform one or more authorized modifications of data, the data comprising a blockchain including at least one cryptographic hash configured to protect the data against unauthorized modifications; transmitting, to the second node in the secured network, one or more characteristics of the user device and/or the first node; receiving, from the second node, a request to execute a first test script of a plurality of test scripts, wherein the user device and/or the first node is selected for execution of the first test script based on the transmitted one or more characteristics of the user device and/or the first node; executing and/or causing the user device to execute the first test script to generate one or more first test script results; generating a first cryptographic hash of the blockchain for the one or more first test script results by performing one or more authorized modifications of first data of the blockchain, the blockchain including the first cryptographic hash configured to protect the data against unauthorized modifications; and transmitting the first cryptographic hash to the second node and causing the second node to verify the one or more first test script results based on the first cryptographic hash generated by the first node and a second cryptographic hash received from a first one or more other nodes in the secured network executing the first test script, the first one or more other nodes sharing at least some of the one or more characteristics with the user device and/or the first node.

In the method of any of the preceding paragraphs or in any of the method disclosed herein, the second node can include a referee node configured to manage activities of the group of nodes.

In the method of any of the preceding paragraphs or in any of the method disclosed herein, the first test script can include a Selenium script.

In the method of any of the preceding paragraphs or in any of the method disclosed herein, the one or more characteristics of the user device and/or the first node can include at least one of a hardware characteristic, a software characteristic, or a network characteristic of the user device and/or the first node.

In the method of any of the preceding paragraphs or in any of the method disclosed herein, the one or more characteristics of the user device and/or the first node can include a user characteristic.

In the method of any of the preceding paragraphs or in any of the method disclosed herein, the first node and the first one or more other nodes comprise edge devices with the one or more characteristics.

In the method of any of the preceding paragraphs or in any of the method disclosed herein, the first node and the first one or more other nodes can be a subset of the group of nodes.

In the method of any of the preceding paragraphs or in any of the method disclosed herein, the method can further comprise, by the at least one processor of a first node: executing and/or causing the user device to execute a second test script to generate one or more second test script results; generating a third cryptographic hash of the blockchain for the one or more second test script results by performing one or more authorized modifications of second data of the blockchain, the blockchain including the third cryptographic hash configured to protect the data against unauthorized modifications; and transmitting the third cryptographic hash to the second node and causing the second node to verify the one or more second test script results based on the third cryptographic hash generated by the first node and a fourth cryptographic hash received from a second one or more other nodes in the secured network executing the second test script, the second one or more other nodes sharing at least some of the one or more characteristics with the user device and/or the first node.

Some embodiments include a non-transitory computer readable medium storing instructions that, when executed by at least one processor of a first node in a secured network, cause the at least one processor to perform a data access method comprising: transmitting, to a second node in the secured network, one or more characteristics of a user device with which the first node is associated and/or the first node; receiving, from the second node, a request to execute a first test script of a plurality of test scripts, wherein the user device and/or the first node is selected for execution of the first test script based on the transmitted one or more characteristics of the user device and/or the first node; executing and/or causing the user device to execute the first test script to generate one or more first test script results; generating a first cryptographic hash of a blockchain for the one or more first test script results by performing one or more authorized modifications of first data of the blockchain; and transmitting the first cryptographic hash to the second node and causing the second node to verify the one or more first test script results based on the first cryptographic hash generated by the first node and a second cryptographic hash received from a first one or more other nodes in the secured network executing the first test script, the first one or more other nodes sharing at least some of the one or more characteristics with the user device and/or the first node.

In the non-transitory computer readable medium of any of the preceding paragraphs or in any of the non-transitory computer readable medium disclosed herein, the second node can include a referee node.

In the non-transitory computer readable medium of any of the preceding paragraphs or in any of the non-transitory computer readable medium disclosed herein, the first test script can include a Selenium script.

In the non-transitory computer readable medium of any of the preceding paragraphs or in any of the non-transitory computer readable medium disclosed herein, the one or more characteristics of the user device and/or the first node can include at least one of a hardware characteristic, a software characteristic, or a network characteristic of the user device and/or the first node.

In the non-transitory computer readable medium of any of the preceding paragraphs or in any of the non-transitory computer readable medium disclosed herein, the one or more characteristics of the user device and/or the first node can include a user characteristic.

In the non-transitory computer readable medium of any of the preceding paragraphs or in any of the non-transitory computer readable medium disclosed herein, the first node and the first one or more other nodes can comprise edge devices with the one or more characteristics.

In the non-transitory computer readable medium of any of the preceding paragraphs or in any of the non-transitory computer readable medium disclosed herein, the user device can be configured to execute software executable instructions to perform one or more functions of the first node, wherein the software executable instructions include at least one of: a mobile application or an executable program.

In the non-transitory computer readable medium of any of the preceding paragraphs or in any of the non-transitory computer readable medium disclosed herein, the method can further comprise: executing and/or causing the user device to execute a second test script to generate one or more second test script results; generating a third cryptographic hash of the blockchain for the one or more second test script results by performing one or more authorized modifications of second data of the blockchain, the blockchain including the third cryptographic hash configured to protect the data against unauthorized modifications; and transmitting the third cryptographic hash to the second node and causing the second node to verify the one or more second test script results based on the third cryptographic hash generated by the first node and a fourth cryptographic hash received from a second one or more other nodes in the secured network executing the second test script, the second one or more other nodes sharing at least some of the one or more characteristics with the user device and/or the first node.

Some embodiments include a non-transitory computer readable medium storing instructions that, when executed by at least one processor of a first node in a secured network, cause the at least one processor to perform a data access method comprising: receiving, from a second node in a secured network, one or more characteristics of a user device associated with the second node; receiving, from a third node, a request to execute a first test script of a plurality of test scripts on the second node and/or the user device, wherein the user device and/or the second node is selected for executing the first test script based on the received one or more characteristics of the user device and/or the second node; receiving a first cryptographic hash from a first one or more other nodes in the secured network executing the first test script, the first one or more other nodes sharing at least some of the one or more characteristics with the user device and/or the second node; receiving a second cryptographic hash from the second node, the second cryptographic hash generated in response to execution of the first test script; verifying the one or more first test script results based on the first cryptographic hash and the second cryptographic hash; and transmitting the verification and the one or more first test script results to the third node.

In the non-transitory computer readable medium of any of the preceding paragraphs or in any of the non-transitory computer readable medium disclosed herein, the one or more characteristics of the user device and/or the second node can include at least one of: a user characteristic, a hardware characteristic, or a software characteristic.

In the non-transitory computer readable medium of any of the preceding paragraphs or in any of the non-transitory computer readable medium disclosed herein, the method can further comprise: receiving, from a fourth node, a request to execute a second test script, wherein the user device and/or the second node is selected for execution of the second test script based on the received one or more characteristics of the user device and/or the second node; receiving a third cryptographic hash from the second node, the third cryptographic hash generated in response to execution of the second test script; receiving a fourth cryptographic hash from a second one or more other nodes in the secured network executing the second test script, the second one or more other nodes sharing at least some of the one or more characteristics with the user device and/or the second node; verifying the one or more first test script results based on the third cryptographic hash and the fourth cryptographic hash; and transmitting the verification to the fourth node.

In the non-transitory computer readable medium of any of the preceding paragraphs or in any of the non-transitory computer readable medium disclosed herein, the first node can include a referee node.

In the non-transitory computer readable medium of any of the preceding paragraphs or in any of the non-transitory computer readable medium disclosed herein, the first test script can include a Selenium script.

In the non-transitory computer readable medium of any of the preceding paragraphs or in any of the non-transitory computer readable medium disclosed herein, the method can further comprise: receiving from the third node a transaction, wherein the third node transmits the transaction in response to a successful verification of the one or more first test script results; and transmitting the transaction to the second node.

DETAILED DESCRIPTION

While certain embodiments are described, these embodiments are presented by way of example only, and are not intended to limit the scope of protection. Indeed, the novel methods and systems described herein may be embodied in a variety of other forms. Furthermore, various omissions, substitutions, and changes in the form of the methods and systems described herein may be made without departing from the scope of protection.

Overview

Some embodiments utilize blockchain technology, which can be used across various industries, such as recording events, medical records, identity management, transaction processing, documenting provenance, food traceability, and voting. Blockchain technology can use multiple blockchains that are processed by a subset and/or the entire blockchain network. For example, one blockchain can be assigned to a particular location and the localized blockchain can execute development applications for that particular location, whereas another blockchain can verify transactions across all nodes in the blockchain. In another example, a blockchain can be assigned based on certain characteristics, such as characteristics of the user, of a user device or edge device (such as, a computing device as described below), of software being execution on the user device, node of the blockchain associated with the user device (such as, software that runs on one or more processors of the user device), and/or the like. Blockchain technology can build upon the blockchain network by allowing new applications and functionality using the security and transaction technology of the blockchain.

Traditional blockchain technology can become increasingly slow and impractical where transactions may need to be verified across a large number of computing nodes (sometimes referred to as "nodes"), causing a large delay and requiring large processing power collectively across nodes. The scalability and the ability to process data quickly is becoming one of the biggest issues facing blockchain technology. Delays associated with processing data may open the blockchain to susceptible attacks, such as a node transmitting two conflicting transactions of a blockchain at the same time. If a certain smart contract or development application on a blockchain sees or experiences an increase in traffic due to increase in token usage or smart contract usage, this can slow down the entire blockchain network. Moreover, nodes running on other blockchain networks can have anonymous users who could tamper with or attack the blockchain network in a variety of ways.

One of problems with testing and verification of one or more of software, firmware, hardware, or the like are test script developers are having difficulty testing multiple devices in actual use case scenarios. The number of different operating system and browser combinations alone number in the thousands, let alone other characteristics that may be relevant, such as device type, processor speed, and location. Test script developers may set up labs and connect devices located in the labs to a private cloud to allow test script developers to access and run test scripts on these devices. However, these test scripts are not executed in actual use. Thus, the test scripts are limited to the devices located in the labs, and are not able to access critical data, such as executing test scripts in real use case scenarios in a certain geographical region using a particular mobile carrier. Moreover, the test scripts are limited by functionality of the available emulators and simulators of environments for the devices.

In some cases, blockchain technology can be utilized to execute the test scripts on the entire blockchain. However, such approaches can become impractical at least because they may not scale due to the verification occurring across all nodes. These approach also can be wasteful on network, processor, and memory resources as all nodes have to verify the test script results. Moreover, such approaches can quickly overload the blockchain with the amount of tests that can occur in parallel. This can lead to the problem of issuing all of the test results over the entire blockchain being slow and inefficient. Moreover, the test results would then have to be reported back from every node of the blockchain. Nodes that are irrelevant to the test script would have to store the test results as well.

Some embodiments provide technical solutions that, by creating a blockchain of a subset of the entire blockchain network that uses the existing infrastructure of the blockchain, can alleviate the delay and reduce the processing time and/or power requirements for verifying transactions across the entire or substantially entire blockchain. The technical solutions can reduce the overall network throughput to perform certain transactions, such as, modifying data, and/or verifying the digital ledger on the blockchain by creating a digital ledger that is specific to the subset of the blockchain network, leading to greater efficiency.

Some embodiments of systems and methods improve blockchain technology by identifying and providing a blockchain of a subset of the entire blockchain network to run test scripts. The subset of nodes of the entire blockchain network can be identified based on relevance of the nodes to the test scripts. For example, a test script can be requested for mobile phones in California. The nodes of the blockchain associated with mobile phones in California can be identified, and the nodes and/or the associated user devices can be assigned to a pool to execute the test script. A blockchain node can be associated with a user device via blockchain software being executed by one or more processors of the user device. After executing the test script, one or more hashes can be generated by each of the subset of nodes, and verified among each other. Advantageously, the test scripts can be executed only on the relevant nodes of the blockchain, and/or can be verified among the subset of nodes on the blockchain. Improvements can include the ability to run test scripts on many edge devices in real life conditions across a wide range of different factors, such as characteristics of the user device, software, operating system, and/or the like. The embodiments include the ability to run test scripts in parallel across the relevant edge devices.

In some embodiments, the test scripts can be executed on the edge device associated with the identified nodes of the blockchain. This can reduce the network throughput as compared to traditional approaches because the edge device would only send the test script results, whereas in traditional approaches, the test scripts are executed on the cloud (or some other external processor(s)) and the edge devices send required information (which is more voluminous than test script results at least because it can include information identifying the user devices) to the cloud for execution of the test scripts. Moreover, the speed at which the test scripts are executed can be improved because the scripts are performed on the edge devices.

In some embodiments, because the test scripts are executed on the edge devices as they being used by end users in real-life conditions, the test scripts can test information that would not be otherwise available. For example, the test scripts can test data at the kernel level.

The user or edge device can include at least one of a mobile phone, computer (such as a laptop or desktop), tablet, server, software, appliances (such as toasters, microwaves, refrigerators), any device with a processor and/or memory, a device that is capable of executing a test script, and/or the like.

System Overview of Network Infrastructure

FIG. 1 is a block diagram illustrating an unsecured and secured network infrastructure according to some embodiments of the present disclosure. The unsecured network 100 of FIG. 1 includes a requestor node 102 and an unsecured network interface 104. The secured network 106 of FIG. 1 includes a first pool of secured nodes 110, a second pool of secured nodes 114, a secured database 120, and a secured network interface 108. The first pool of secured nodes 110 can include a third node 112. The second pool of secured nodes 114 can include a first node 116 and a second node 118.

In some embodiments, the network can include an unsecured network 100 and a secured network 106. The unsecured network 100 can include nodes, such as the requestor node 102 that does not have access privileges to data, such as access to modify data in the secured database 120.

The requestor node 102 can request access to the secured network 106. For example, the requestor node 102 can send a request to join a team via the unsecured network interface 104 that can communicate with a node within the secured network 106 via the secured network interface 108. A node of the secured network, such as the first node 116, the second node 118, or the third node 112, can receive the request from the requestor node 102 and assign the requestor node 102 to a pool within the secured network 106, such as the first pool 110 or the second pool 114 of secured nodes.

Any of the nodes or relays disclosed herein can include a computing device with one or more processors or attached computational devices. The computing device can be one or more of a server, edge computing device, personal computer, tablet, mobile device, or the like.

Example Use Case for Test Script Execution on Subset of Nodes

FIGS. 2A-2E are example use cases for test script execution on a subset of nodes of the entire blockchain network according to some embodiments of the present disclosure. In the example of FIGS. 2A-2E, the entire blockchain network includes 6 nodes: $1^{st}$ node 202A, $2^{nd}$ node 202B, $3^{rd}$ node 202C, $4^{th}$ node 202D, $5^{th}$ node 202E, and $6^{th}$ node 202F (not shown in FIGS. 2A-2E, but shown in FIGS. 3A-3B) (collectively referred to herein as nodes 202).

The nodes 202 can each be associated with an edge device, such as a mobile phone or a laptop. Each node 202 can install an agent, or software, that can communicate with the blockchain. The agents 206A, 206B, 206C, 206D, 206E, 206F (not shown) can collect information on the edge device, such as information for determining nodes for the test scripts in FIG. 4. Any of the nodes disclosed herein can include a computing device with one or more processors or attached computational devices. The computing device can be one or more of a server, edge computing device, personal computer, tablet, mobile device, or the like. The user device, such as a computing device, can include software that runs the functionalities of the nodes, such as a mobile application or an executable program.

The agents can transmit the information to the blockchain such that a software developer 204 can identify relevant nodes for a test script. The information can be collected and/or transmitted upon request, continuously over a time period, individually collected, collected on batch, collected based on a push command, collected based on a pull command, and/or the like.

In some embodiments, the agent can include a mobile application, such as an application for the blockchain. In some embodiments, the agent can include executable software, such as an executable application, a browser plug-in, and/or the like.

Figure 2A:
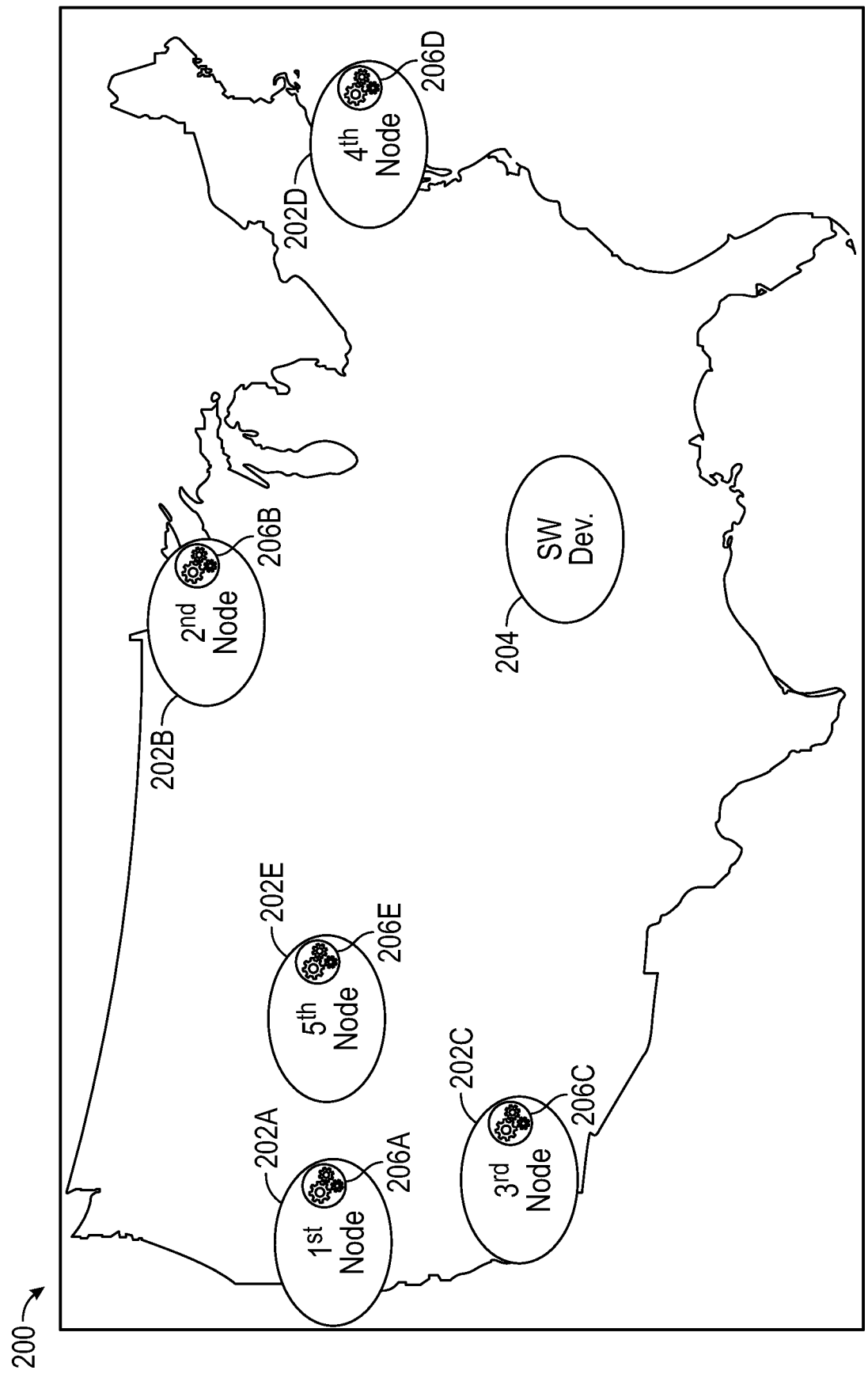
FIGS. 2A-2E are example use cases for test script execution on a subset of nodes of the entire blockchain network according to some embodiments of the present disclosure.

FIG. 2A illustrates an example of a software developer 204 requesting to run a test script according to some embodiments of the present disclosure. The software developer 204 may request to run a Selenium test script for a functional test within a library on mobile devices in California. In some embodiments, the software developer 204 can include other criteria, such as operating system, browser type, device type, and/or the like (described in further detail in FIG. 4).

Figure 2B:
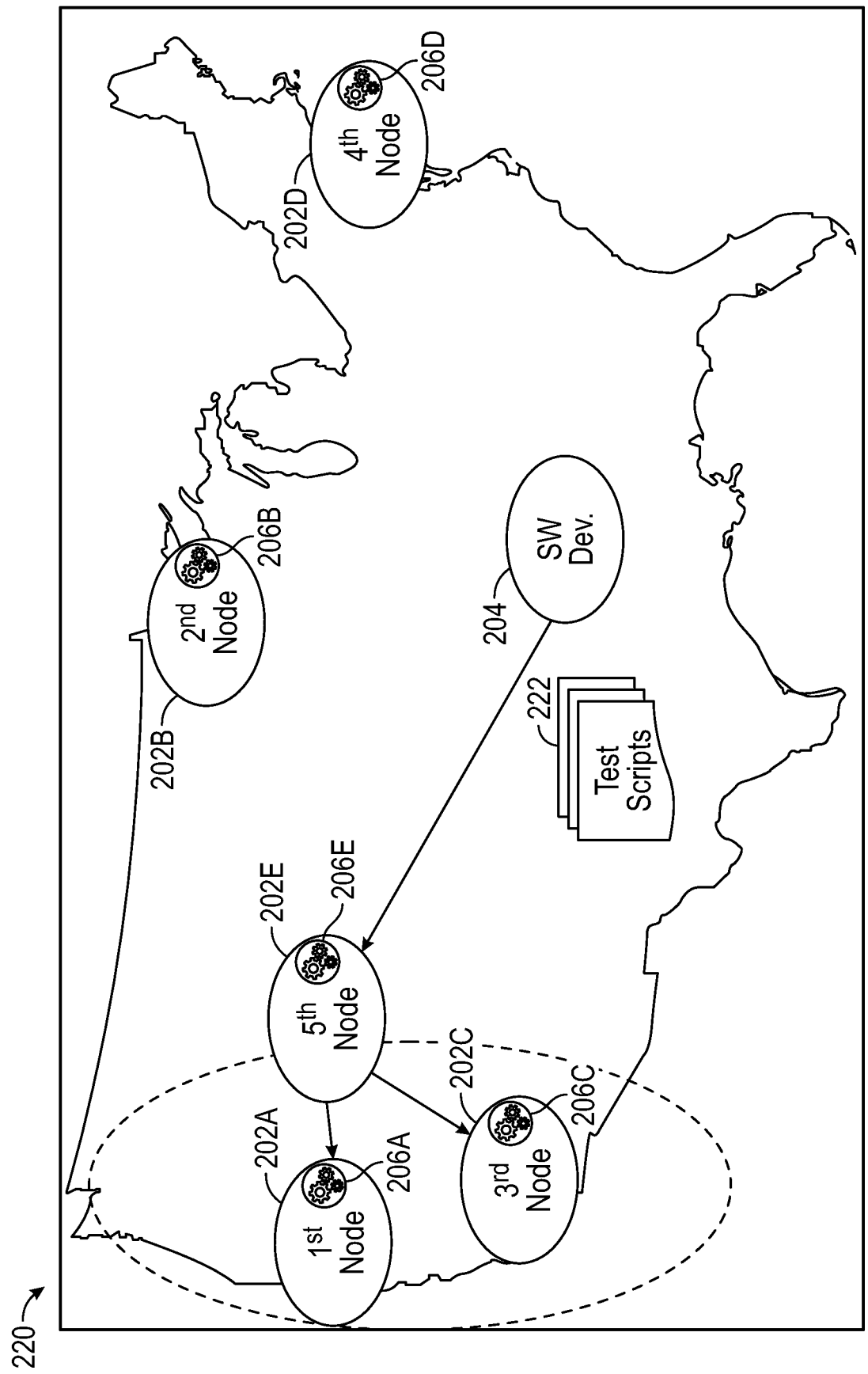

FIG. 2B illustrates an example of the $5^{th}$ node 202E receiving the request and the test scripts 222 from the software developer according to some embodiments of the present disclosure. The $5^{th}$ node 202E can identify the $1^{st}$ node 202A and the $3^{rd}$ node 202C meeting the criteria of the test script. For example, the $1^{st}$ node 202A and the $3^{rd}$ node 202C can be associated with mobile phones that are in northern and southern California, respectively. The $5^{th}$ node 202E can determine that itself (the $5^{th}$ node 202E), the $2^{nd}$ node 202B and the $4^{th}$ node 202D do not meet the criteria for the test script. The $5^{th}$ node 202E can create a team of a subset of nodes, including the $1^{st}$ node 202A and the 3rd node 202C. The edge devices for the $1^{st}$ node 202A and the $3^{rd}$ node 202C can receive the test scripts and run the test scripts locally.

In some embodiments, a $5^{th}$ node 202E, such as a referee node, determines relevant nodes for the test scripts based on criteria set by the software developer 204. In the event none of the nodes meet the criteria, a message can be sent back to the software developer notifying them of this event. The test scripts can be deleted from the blockchain and the blockchain does not initiate test scripts. The referee nodes can assign the relevant nodes to a team and perform transactions and verifications within the team using proof of competition, as described in U.S. patent application Ser. No. 16/005,272, filed on Jun. 11, 2018, the entirety of which is incorporated by reference in its entirety.

The teams can be managed by referee nodes. For example, for every 25 nodes on a team, a referee can be assigned to manage the 25 nodes. In some embodiments, a team can be managed by one or more referee nodes. In some embodiments, referee nodes can be assigned based on geography, such as political geography.

The referee nodes can keep track of the number of nodes on each team or the assigned team. The referee nodes can keep track of the geolocations of the nodes on each team or the assigned team. The referee nodes can assign new nodes or remove existing nodes on a team, such as depending on the needs of the team. The referee nodes can manage the data processed by the team nodes assigned to the team that the referee nodes manages, such as ensuring that the data processed by each team node is correct or lock smart contracts that may indicate malicious behavior by a network-selected cyber security organization.

The team nodes can request to perform computations of the network by connecting to a referee node. The team nodes can process data, transactions, smart contracts, or the like.

The referee node can help manage the network and ensure the network is performing fairly. The referee node can facilitate the creation of new teams, route network traffic, and assign/reassign nodes to a node. Referee nodes can be controlled by an input of a user or automatically. Referees can be selected by the network via voting or reassigned via voting. Referee nodes can become DNS relays.

In other embodiments, the software developer 204 can identify and/or select particular nodes to run the scripts, such as by accessing information on edge devices from a database. Then, the software developer 204 can send the test scripts directly to the relevant nodes.

Figure 2C:
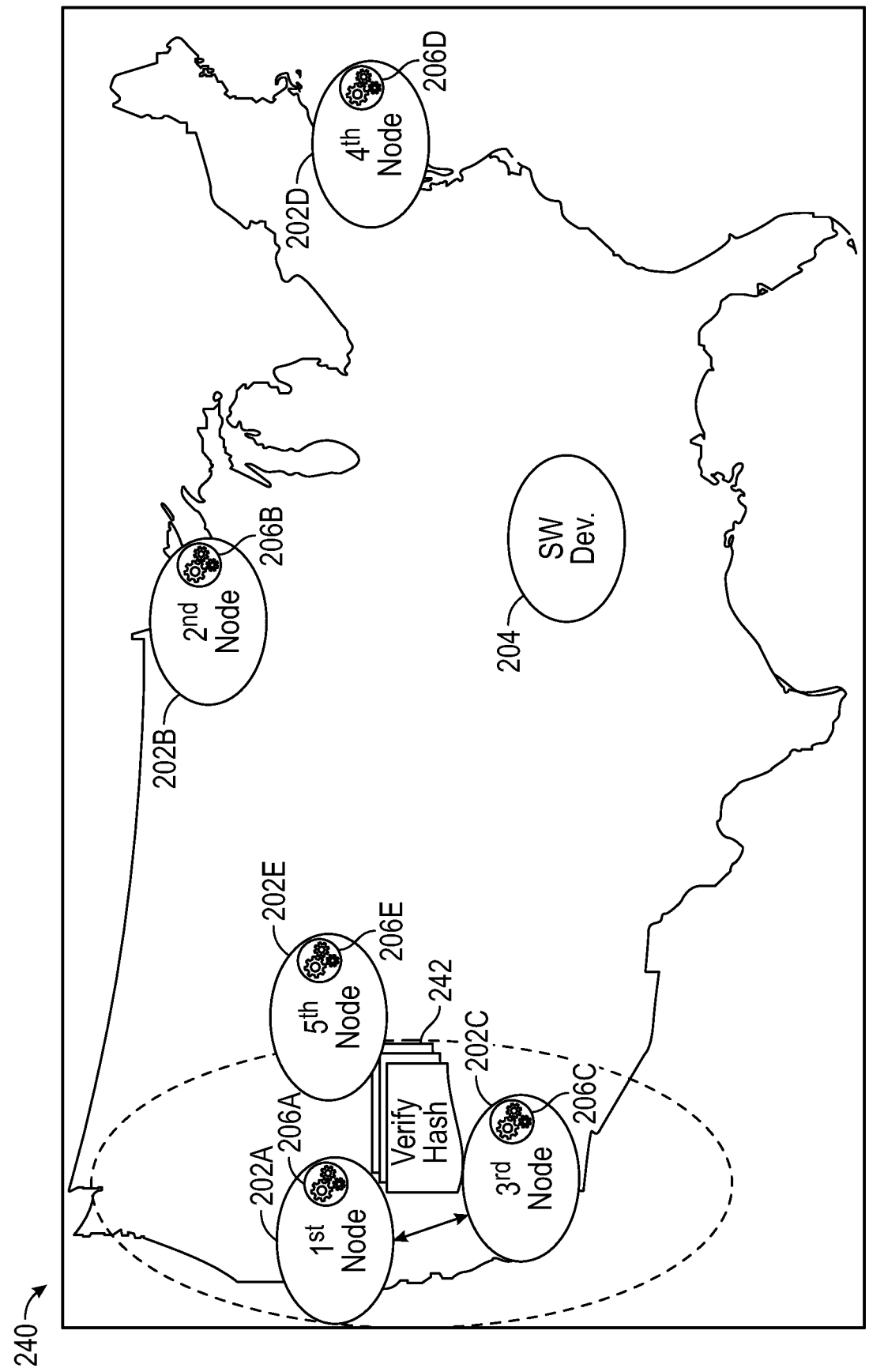
Figure 2D:
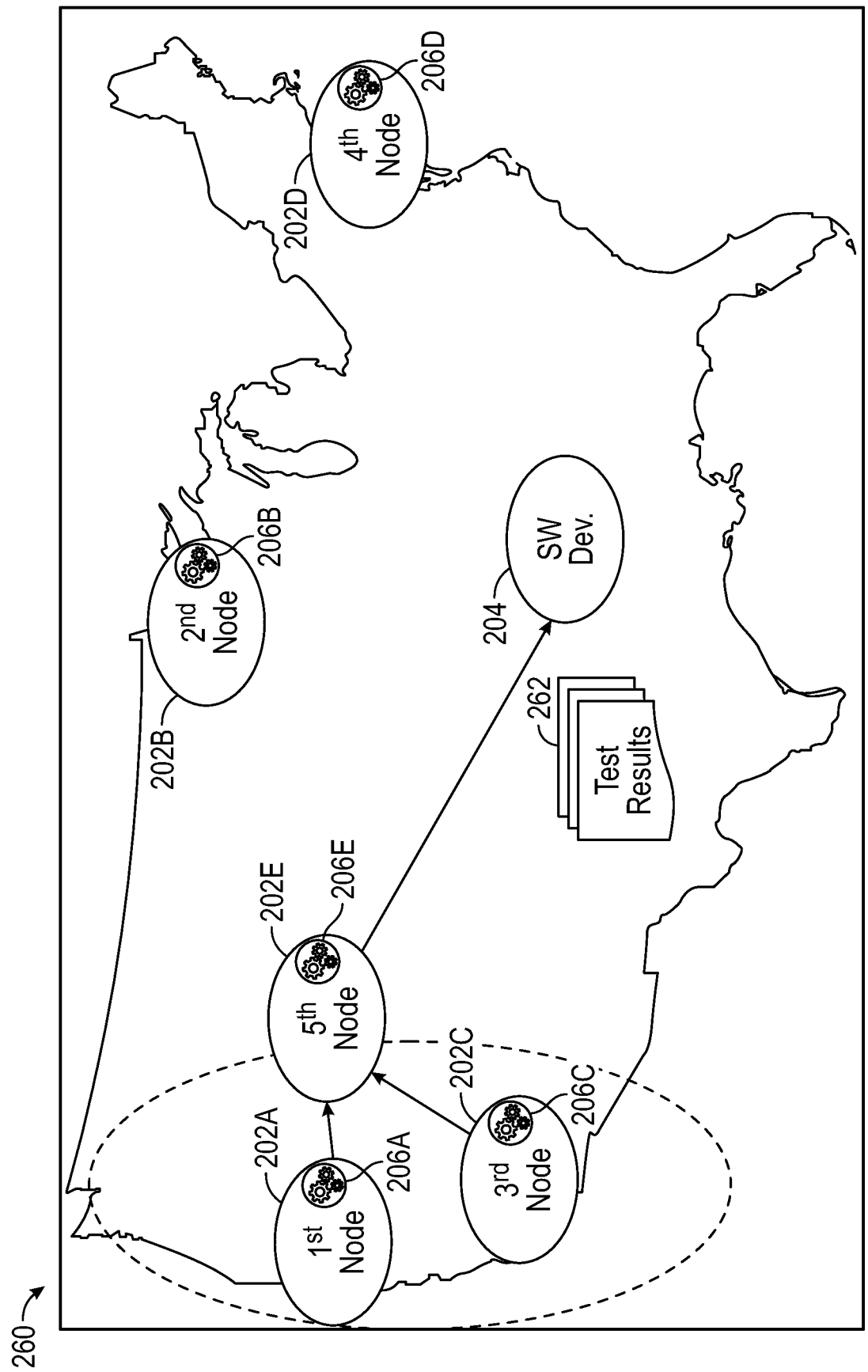

FIG. 2C illustrates an example of the nodes executing the scripts to generate a hash 242 according to some embodiments of the present disclosure. For example, the $1^{st}$ node 202A and the $3^{rd}$ node 202C can each generate a hash 242 for the respective functional tests, and these hashes 242 can be checked among each other in the team. For example, the $1^{st}$ node 202A and the $3^{rd}$ node 202C can verify that the hash 242 of the respective functional tests are verified. Accordingly, the verification is occurring in only a subset of nodes of the entire blockchain network, reducing resource usage, network throughput usage, processing power, and/or the like. In some embodiments, another node, such as a referee node, the $5^{th}$ node 202E, or a node associated with the software developer 204 can verify the hash 242. The hash 242 is verified with other nodes to ensure that the test script was properly executed. For example, the hash 242 can be compared with the hashes generated by other nodes that are running the test script. FIG. 2D illustrates an example of the test results 262 being sent to the software developer 204 according to some embodiments of the present disclosure.

Figure 2E:
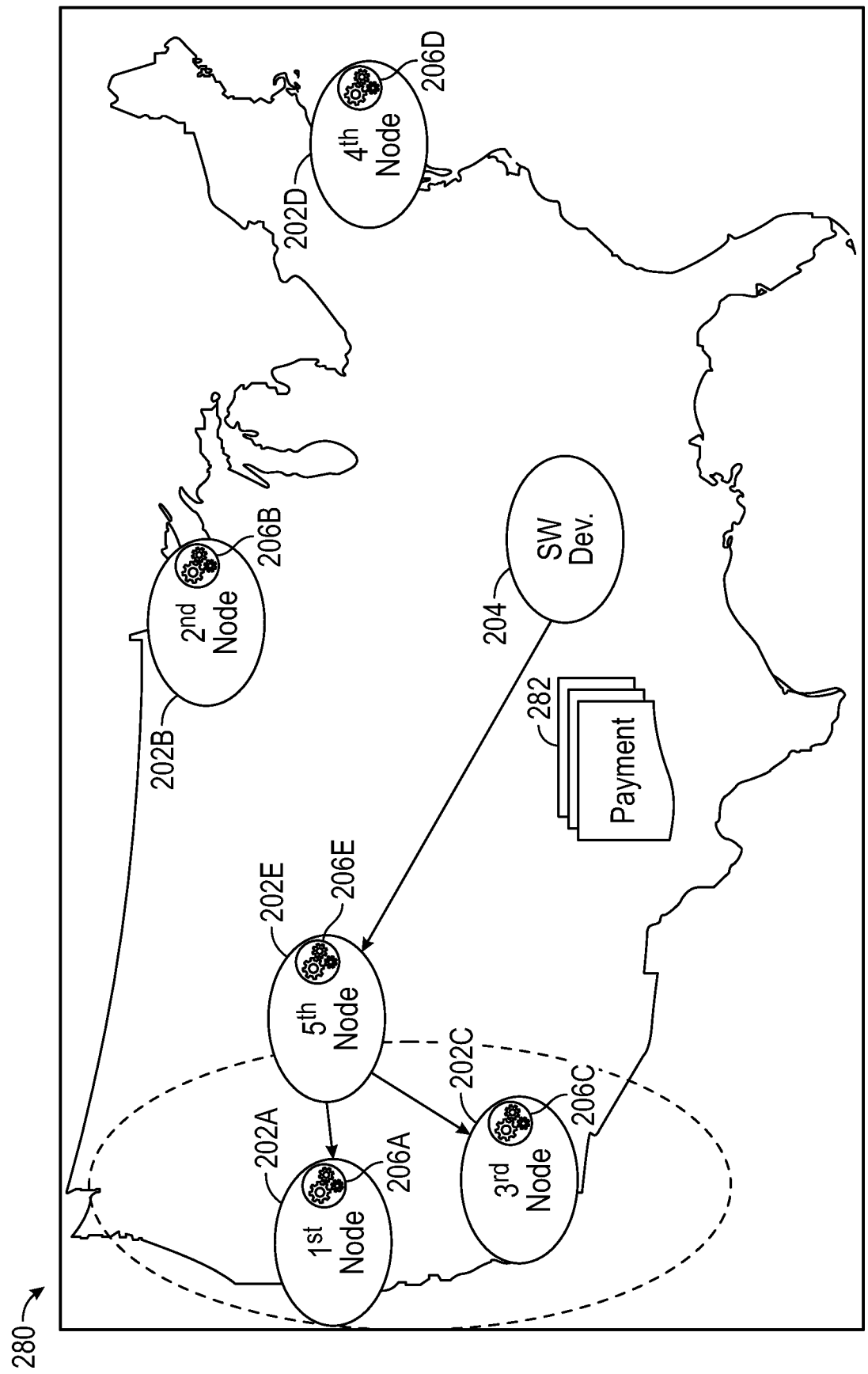

FIG. 2E illustrates an example of the software developer 204 sending a transaction, such as a payment 282, to the nodes that executed the test script according to some embodiments of the present disclosure. In some embodiments, the transactions can be sent at different times than after the execution of the test script, such as when the test scripts 222 are initially sent to the nodes. In some embodiments, the transactions can vary based on the type of test scripts or other characteristics of the test scripts, such as based on the test script results.

In some embodiments, the transaction can include transferring tokens, such as objects or coins of the blockchain, to another account. The transaction can be to subtract an amount of tokens from one account and add the amount of tokens to another account. The ledger can indicate that the tokens were subtracted from one account and added to another account.

The ledger can include an option where tokens are immediately removed from the sending account, then sent in portions at a later time. Multiple hashes that represent the portion transactions can be requested at later varying times. Advantageously, the transaction can include an additional layer of transactional anonymity.

Nodes on a team can keep track of the total number of tokens currently on the network or assigned to the team. As coins are subtracted and added based on each transaction, the total coin for the network or for each team can be updated. Referee nodes can continually share the latest coin count changes amongst each other, or pass these changes to other nodes.

An account can include a token wallet. An account can be created by a node or processor using an input from a user. In some embodiments, users trying to create the account can be requested or required to verify a series of transactions and blocks, or pay to create an account, such as in the amount of tokens. The token payment can be distributed to nodes within the team or pools within the team. Accounts can be assigned to a particular team and not to the entire network. Accounts can hold an amount of tokens or be able to transfer tokens to other accounts on the same or different teams. Each account can be associated with a public key and a private key. Accounts can include an email with the username, a team name, or a token symbol. For example, an account address can be: nathan@team10.xrj.

An example format can be: [Account name]@team[number].[token symbol]

Tokens or objects of the blockchain can be sent or received from the wallet. For example, game objects or real estate objects can be transferred from one person to another. An example of a real estate transfer can be: nathan@team10.object→house. Advantageously, objects can be securely transferred via a smart contract or a development application securely.

An example format can be: [Account name]@team[number].object→[object symbol]

A url encoded query string can be appended to the end of the account as the transaction destination. Two examples of such a URL encoded query string can be:
nathan@team10.object→house?id=19&name=Cool+house
nathan@team10.xri?message=Hi+there+guy In block 420, nodes can be provided tokens, such as blockchain coins, based on the performed computations performed for the localized pool or the overall blockchain.

In some embodiments, the blockchain network or a particular team can generate a certain number of tokens per time interval. For example, 1.65 tokens can be generated per hour. If there are 200 teams with 100 nodes and 4 referees for each team, approximately 2,890,800 tokens can be generated per year.

Figure 3A:
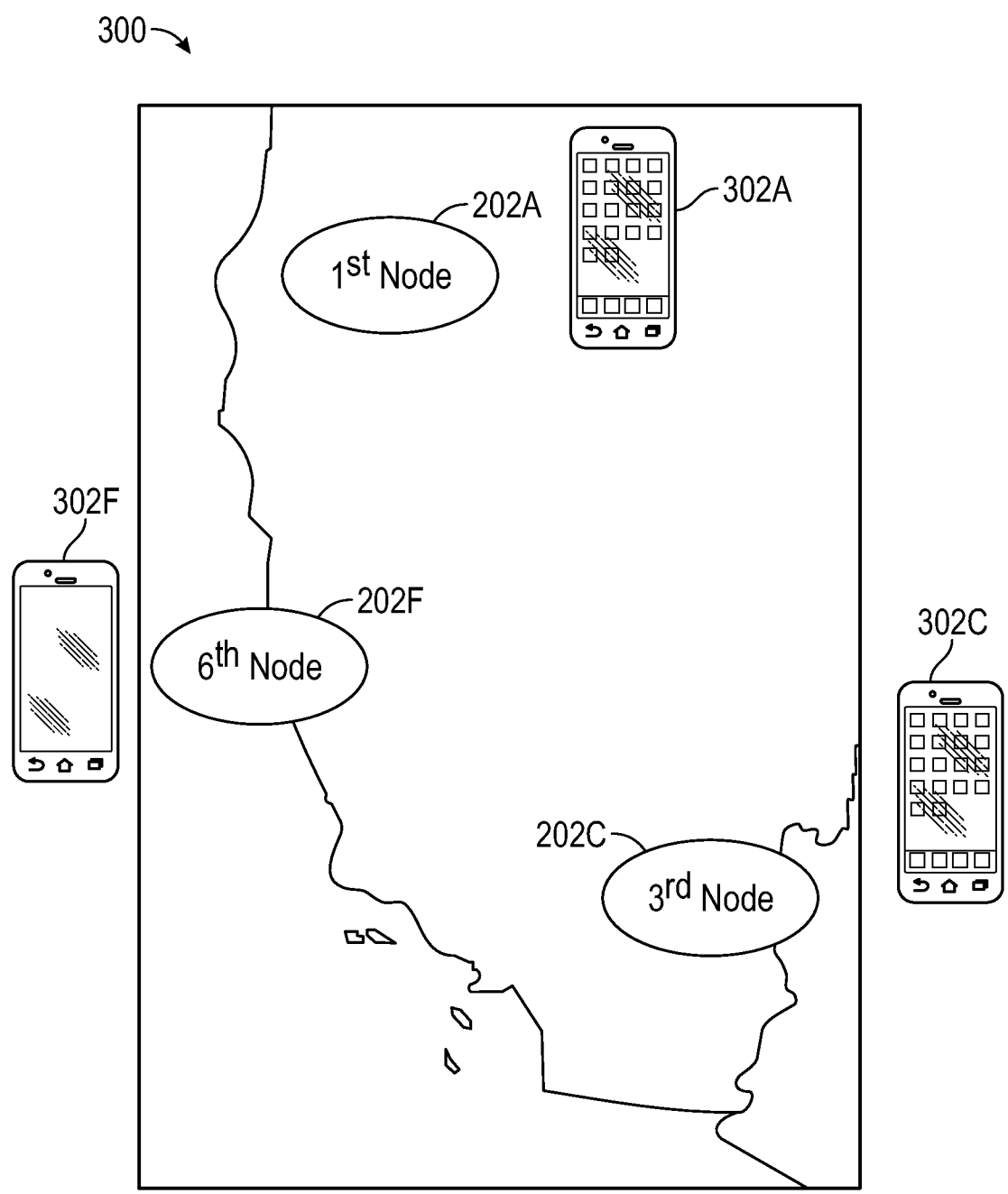
FIGS. 3A-3B are example use cases for test script execution on a subset of nodes of the entire blockchain network based on device type according to some embodiments of the present disclosure.
Figure 3B:
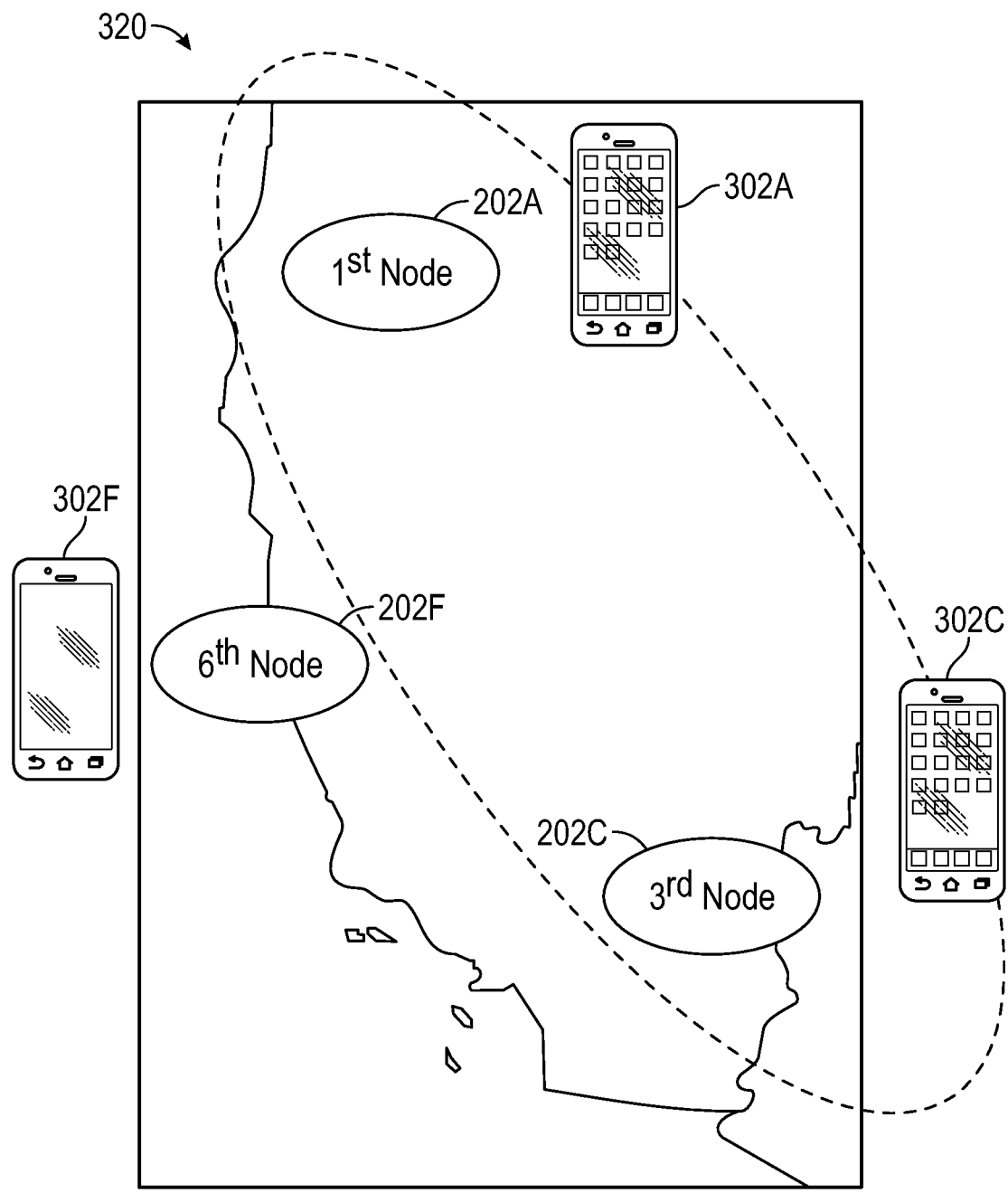

An non-limiting example of a mining payout can include:
0.1 Tokens to the Captain
0.5 Tokens split between each node on the team
0.1 Tokens to the developers
0.1 Tokens to each DNS relay on the team
0.05 Tokens to a pool for DDOS protection services
0.1 Tokens to a pool for bug bounties and security vulnerabilities
0.1 Tokens to a pool for the network's legal representatives
0.1 Tokens split evenly amongst the background screening providers
0.1 Tokens split evenly amongst the cyber security organizations
0.1 Tokens to each referee on the team to help maintain the network The tokens created on the network can remain only on that team. The symbol associated with the token can be distributed among the referee nodes, such that traffic can be routed between teams. Token symbols and object symbols can be reserved for a fee of a certain number of tokens per time period, such as 0.01 tokens per year. Tokens can be used on run transactions on the network, such as 0.00001 tokens per hour. For every certain number of transactions per hour, the token fee can include a multiplier. For example:
Hour 1: 30,000 tx/h—0.00001 tokens/h
Hour 2: 40,000 tx/h—0.00002 tokens/h
Hour 3: 40,000 tx/h—0.00002 tokens/h
Hour 4: 70,000 tx/h—0.00002 tokens/h
Hour 5: 80,000 tx/h—0.00003 tokens/h
Hour 6: 90,000 tx/h—0.00003 tokens/h
Hour 7: 120,000 tx/h—0.00004 tokens/h Example Use Case for Test Script Execution Based on Device Type FIGS. 3A-3B are example use cases for test script execution on a subset of nodes of the entire blockchain network based on device type according to some embodiments of the present disclosure. In the example of FIGS. 3A-3B, the entire blockchain network includes 6 nodes: $1^{st}$ node 202A, $2^{nd}$ node 202B, $3^{rd}$ node 202C, $4^{th}$ node 202D, $5^{th}$ node 202E, and $6^{th}$ node 202F ($2^{nd}$ node 202B, $4^{th}$ node 202D, and $5^{th}$ node 202E not shown in FIGS. 3A-3B, but shown in FIGS. 2A-2E) (collectively referred to herein as nodes 202).

FIG. 3A illustrates an example of a software developer 204 requesting to run a test script for device type 1 in a particular region according to some embodiments of the present disclosure. The $1^{st}$ node 202A, the $3^{rd}$ node 202C, and the $6^{th}$ node 202F can be associated with the particular region. The system can assess the device types of the edge devices corresponding to $1^{st}$ node 202A, the $3^{rd}$ node 202C, and the $6^{th}$ node 202F that are in the particular region. The $1^{st}$ edge device 302A of $1^{st}$ node 202A and the $3^{rd}$ edge device 302C of $3^{rd}$ node 202C can correspond to device type 1, and the $6^{th}$ edge device 302F of $6^{th}$ node 202F can correspond to device type 2.

FIG. 3B illustrates the identification of nodes with edge devices corresponding to the desired device type for testing according to some embodiments of the present disclosure. The $1^{st}$ node 202A and the $3^{rd}$ node 202C are selected to form a team, and the test scripts are sent to the $1^{st}$ node 202A and the $3^{rd}$ node 202C to execute the test scripts specific to device type 1. Advantageously, the software developer can test scripts in real-time and in actual use for device type 1 in a certain location, such as in California. Moreover, the test scripts can be executed in parallel, reducing the time required to run various test scripts over a wide number of devices.

Factors for Determining Nodes for Executing Test Scripts

Figure 4:
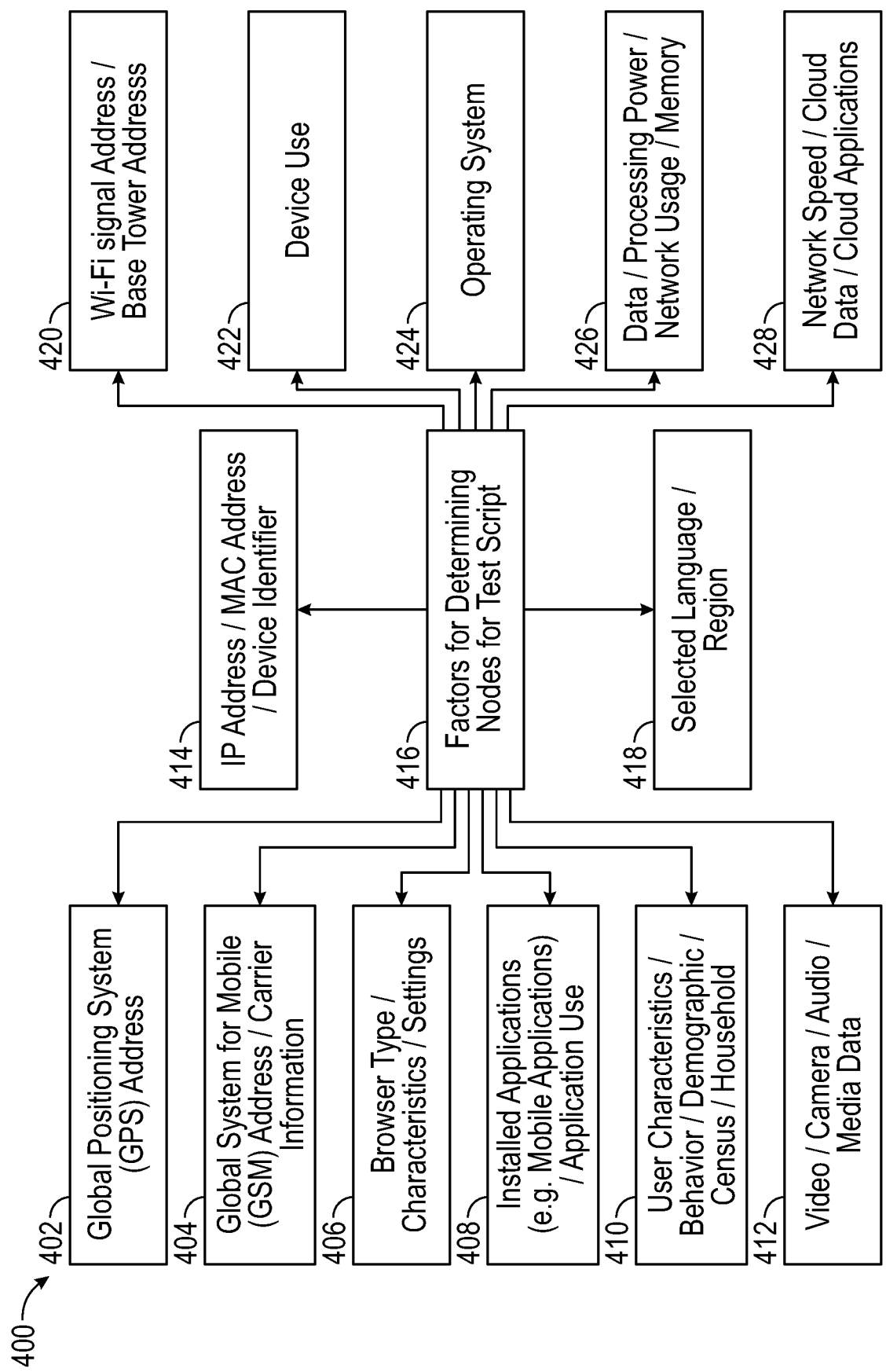
FIG. 4 is a block diagram illustrating factors for determining nodes for executing test scripts according to some embodiments of the present disclosure.

FIG. 4 is a block diagram illustrating factors for determining nodes for executing test scripts according to some embodiments of the present disclosure. The data related to the factors 416 can be retrieved by a referee node of a team to determine whether the node, the edge device associated with the node, and/or the like has the characteristics that the software developer is requesting to test.

The factors 416 can include factors of the device, such as the device type described in FIGS. 3A-3B. The factors 416 can include specific characteristics of the device, such as hardware, an operating system 424, data, processing power, network usage, and memory capacity 426, video, camera, audio, media devices associated with video, camera, audio, or media data 412, and/or the like.

The factors 416 can include a network characteristic of the device. The factors 416 can include an IP address, a MAC address, and/or a device identifier 414. The factors 416 can include a global positioning system (GPS) address 402, a global system for mobile (GSM) address and/or carrier information 404, a WiFi signal or base tower address 420, a network speed, cloud data, cloud applications 428, and/or the like.

The factors 416 can include software characteristics, such as a browser type, a browser characteristic, or a browser setting 406, a selected language or a region 418, installed applications (such as mobile applications) and/or application use, and/or the like.

The factors 416 can include a user characteristic, such as video, camera, audio, or media data 412, user online behavior, user demographic, user related census data, household data 410, and/or the like.

Process for Test Script Execution by a Node and/or Edge Device

Figure 5:
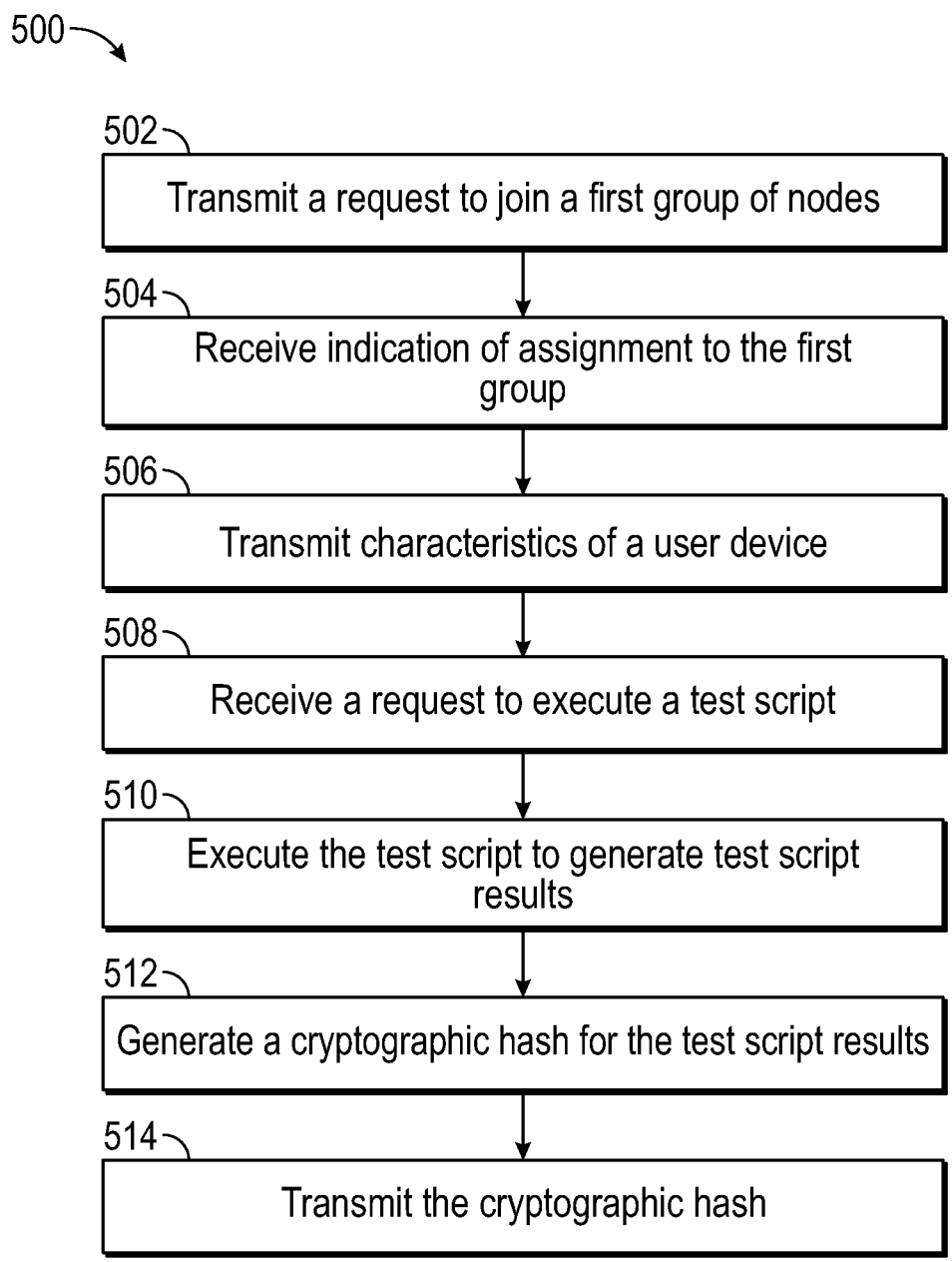
FIG. 5 is a process of execution of a test script from the perspective of a node and/or an edge device according to some embodiments of the present disclosure.

FIG. 5 is a process 500 of execution of a test script by a node and/or an edge device according to some embodiments of the present disclosure. The edge device can be associated with a user device with an application installed in order to communicate with the blockchain. The edge device can use the application to be assigned to a node. In some embodiments, the steps in the process 500, and/or a subset of the steps, can be performed by one or more entities, such as the software developer, a referee node, and/or an edge device.

At step 502, the edge device can transmit a request to join a first group of nodes, such as a subset of nodes of the blockchain network. For example, the edge device can request to join a group of nodes in a particular region, such as California. A first referee node can receive the request, transmit the request to the corresponding second referee node for the California team, and the second referee node can assign the node of the edge device to the first team. At step 504, the second referee node can assign the node, and the edge device can receive the indication of an assignment to the first group. In other embodiments, the first group of nodes includes the entire blockchain network.

At step 506, the edge device can transmit characteristics of the user device. For example, the node of the edge device can retrieve characteristics of the edge device, such as hardware (such as memory capacity, processing power), location (such as GPS data), user information (such as household data or online behavior), software (such as applications, operating system), and/or the like.

At step 508, the node of the edge device can receive a request to execute a test script. The node can be receiving the request based on a software developer submitting criteria for the test scripts, and the blockchain (such as a referee node) determines that the node of the edge device meets the criteria for the test scripts. Then, the referee node assigns the node of the edge device to a team for the execution of the test scripts, and the referee node can forward the test scripts to the node of the edge device.

At step 510, the node of the edge device can execute the test scripts to generate test script results. At step 512, the node can generate a cryptographic hash for the test script results, and at step 514, the node can transmit the cryptographic hash to the referee node to be sent back to the software developer. Then, the software developer can determine whether the test scripts were successfully executed based on the cryptographic hash. In other embodiments, the execution of the test scripts generates the cryptographic hash.

In some embodiments, the edge device can communicate the characteristics of the edge device in step 506, communicate edge device testing script related data, and/or the like via a communication protocol. The communication protocol can be automatically installed and/or set up on the edge device. The communication protocol can be based on a characteristic of the edge device, such as a bandrate of the operating system.

Process for Requesting Test Script Execution by a Software Developer

Figure 6:
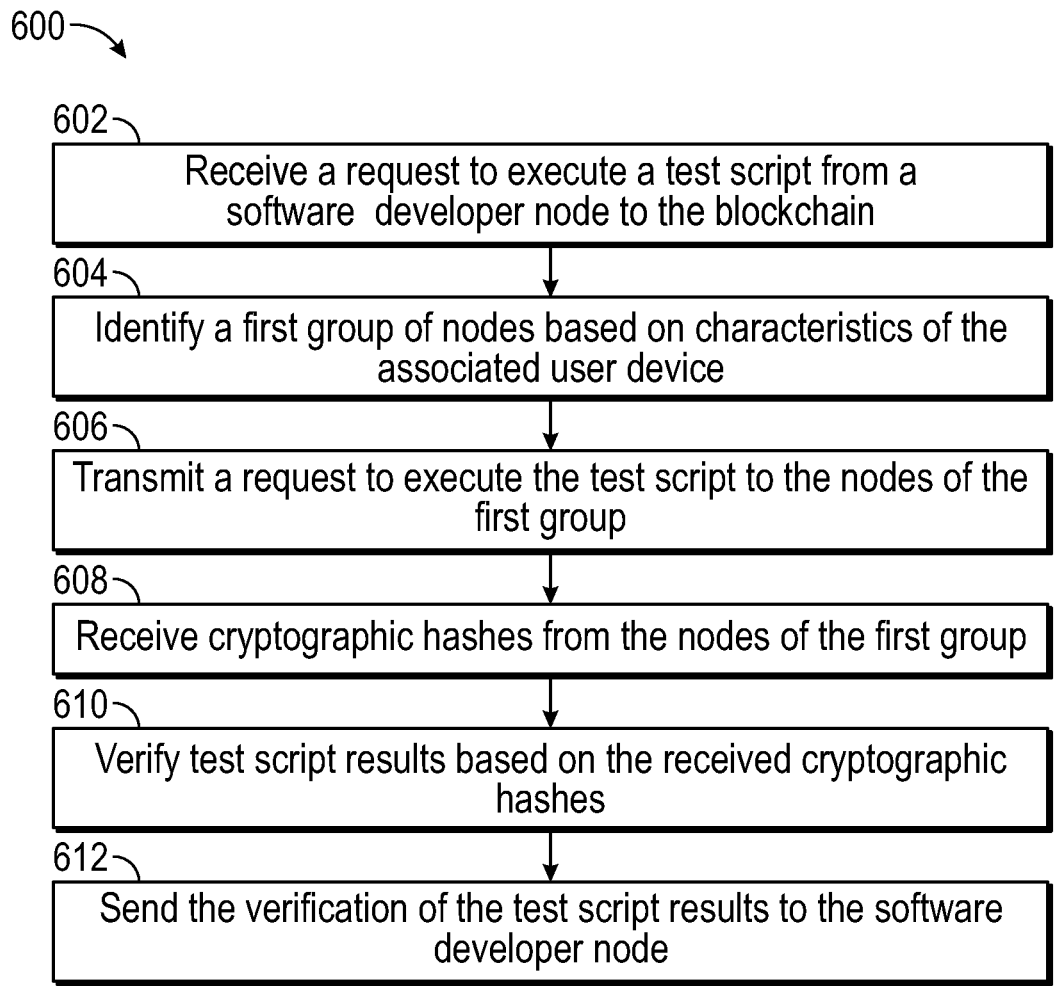
FIG. 6 is a process of test script execution from the perspective of a referee node according to some embodiments of the present disclosure.

FIG. 6 is a process 600 of test script execution according to some embodiments of the present disclosure. The process 600 can be executed by a referee node. The software developer can send via the blockchain criteria for edge devices that the software developer wants to test. The blockchain, such as via a referee node, can identify nodes that meet the software developer criteria, execute the test scripts on the identified nodes, and send back the test results to the software developer. In some embodiments, the steps in the process 600, and/or a subset of the steps, can be performed by one or more entities, such as the software developer, a referee node, and/or an edge device.

At step 602, the blockchain, such as via a referee node, can receive a request to execute a test script to the blockchain from a software developer. At step 604, the referee node can identify a first group of nodes based on certain characteristics, such as the characteristics associated with edge devices of nodes of the blockchain. For example, the referee node can identify the criteria that the software developer wants to test, and the identified first group of nodes can be nodes that meet the criteria.

At step 606, the referee node can transmit a request to execute the test script to the nodes of the first group. The nodes of the first group can execute the test scripts and generate a cryptographic hash of the test script results.

At step 608, the software developer can receive the cryptographic hash from the referee node that collected the hashes from nodes of the first group, and at step 610, the referee node can use the received cryptographic hash to verify the test script results. At step 612, the referee node can send verification of the test script results to the software developer node.

Other Variations

Those skilled in the art will appreciate that in some embodiments additional system components can be utilized, and disclosed system components can be combined or omitted. Although some embodiments describe video data transmission, disclosed systems and methods can be used for transmission of any type of data. In addition, although some embodiments utilize erasure coding, any suitable error correction schemes can be used. The actual steps taken in the disclosed processes, such as the processes illustrated in FIGS. 2A-2C, may differ from those shown in the figures. Depending on the embodiment, certain of the steps described above may be removed, others may be added. Accordingly, the scope of the present disclosure is intended to be defined only by reference to the appended claims.

While certain embodiments have been described, these embodiments have been presented by way of example only, and are not intended to limit the scope of the protection. Indeed, the novel methods and systems described herein may be embodied in a variety of other forms. Furthermore, various omissions, substitutions and changes in the form of the methods and systems described herein may be made without departing from the spirit of the protection. The accompanying claims and their equivalents are intended to cover such forms or modifications as would fall within the scope and spirit of the protection. For example, the various components illustrated in the figures may be implemented as software or firmware on a processor, ASIC/FPGA, or dedicated hardware having one or more logic circuits. Also, the features and attributes of the specific embodiments disclosed above may be combined in different ways to form additional embodiments, all of which fall within the scope of the present disclosure.

The terminology used herein is for the purpose of describing particular embodiments only and is not intended to be limiting of this disclosure. As used herein, the singular forms "a", "an" and "the" are intended to include the plural forms as well, unless the context clearly indicates otherwise. It will further be understood that the terms "comprises" or "comprising," when used in this specification, specify the presence of stated features, integers, steps, operations, elements, or components, but do not preclude the presence or addition of one or more other features, integers, steps, operations, elements, components, or groups thereof. Further, references to "a method" or "an embodiment" throughout are not intended to mean the same method or same embodiment, unless the context clearly indicates otherwise.

Conditional language, such as "can," "could," "might," or "may," unless specifically stated otherwise, or otherwise understood within the context as used, is generally intended to convey that certain embodiments include, while other embodiments do not include, certain features, elements, or steps. Thus, such conditional language is not generally intended to imply that features, elements, or steps are in any way required for one or more embodiments or that one or more embodiments necessarily include logic for deciding, with or without user input or prompting, whether these features, elements, or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

The corresponding structures, materials, acts, and equivalents of all means or step plus function elements in the claims below are intended to include any structure, material, or act for performing the function in combination with other claimed elements as specifically claimed. The description of the various embodiments of the present disclosure has been presented for purposes of illustration and description, but is not intended to be exhaustive or limited to the embodiments disclosed. Many modifications and variations will be apparent to those of ordinary skill in the art without departing from the scope and spirit of this disclosure. The example embodiments were chosen and described in order to best explain the principles of this disclosure and the practical application, and to enable others of ordinary skill in the art to understand this disclosure for various embodiments with various modifications as are suited to the particular use contemplated.

Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. An access control method comprising:
receiving at a first node, from a second node associated with a software developer, a first test script of a plurality of test scripts and a request to execute the first test script on a subset of a plurality of nodes that store a blockchain and that meet one or more required characteristics, wherein the one or more required characteristics include a required location area;
by the first node, identifying locations of the plurality of nodes that store the blockchain, wherein the plurality of nodes that store the blockchain are on a secured network using a secured network protocol, wherein the plurality of nodes that store the blockchain are configured to perform one or more authorized modifications of data in the blockchain;
by the first node, assessing locations of the plurality of nodes that store the blockchain to identify the subset of the plurality of nodes that are located in the required location area, wherein identifying the subset of the plurality of nodes comprises, for each node of the plurality of nodes:
determining whether a location of a node of the plurality of nodes is in the required location area; and
in response to determining that the location of the node is in the required location area, adding the node to the subset of the plurality of nodes;
executing the first test script by each node in the subset of the plurality of nodes to generate a corresponding cryptographic hash based on one or more first test script results of the first test script by performing one or more authorized modifications of first data of the blockchain, the blockchain including a first cryptographic hash determined from the cryptographic hashes generated by the subset of the plurality of nodes, the first cryptographic hash configured to protect the data against unauthorized modifications;
by the first node, determining that the first test script was executed properly on the subset of the plurality of nodes by comparing the cryptographic hashes generated by the subset of the plurality of nodes to each other;
by the first node, transmitting the one or more first test script results to the second node in response to determining that the first test script was executed properly; and
by the second node, verifying the one or more first test script results and transmitting a payment transaction to each node of the subset of the plurality of nodes in response to a successful verification of the one or more first test script results, wherein the payment transaction varies based on a type of the first test script executed.

2. The method of claim 1, wherein the first node includes a referee node configured to manage activities of the plurality of nodes.

3. The method of claim 1, wherein the first test script includes a Selenium script.

4. The method of claim 1, wherein the second node and the subset of the plurality of nodes comprise edge devices.

5. The method of claim 1, further comprising:
executing a second test script by each node in the subset of the plurality of nodes to generate one or more second test script results;
generating a second cryptographic hash of the blockchain for the one or more second test script results by performing one or more authorized modifications of second data of the blockchain, the blockchain including the second cryptographic hash configured to protect the data against unauthorized modifications; and
by the first node, transmitting the second cryptographic hash to the second node; and
by the second node, verifying the one or more second test script results based on the second cryptographic hash and a third cryptographic hash received from another node of the plurality of nodes that executed the second test script, the another node sharing one or more characteristics with the first node.

6. A non-transitory computer readable medium storing instructions that, when executed by one or more processors, cause the one or more processors to perform a data access method comprising:
receiving at a first node, from a second node associated with a software developer, a first test script of a plurality of test scripts and a request to execute the first test script on a subset a plurality of nodes that store a blockchain;
by the first node, identifying locations of the plurality of nodes that store the blockchain, wherein the plurality of nodes that store the blockchain are on a secured network using a secured protocol, wherein the plurality of nodes that store the blockchain are configured to perform one or more authorized modifications of data in the blockchain;
by the first node, assessing locations of the plurality of nodes that store the blockchain to identify the subset of the plurality of nodes that are located in a particular location, wherein identifying the subset of the plurality of nodes comprises, for each node on the plurality of nodes:
determining whether a location of a node of the plurality of nodes is in the particular location; and
in response to determining that the location of the node is in the particular location, adding the node to the subset of the plurality of nodes;
executing the first test script by each node in the subset of the plurality of nodes to generate a corresponding cryptographic hash based on one or more first test script results of the first test script by performing one or more authorized modifications of first data of the blockchain, the blockchain including a first cryptographic hash determined from the cryptographic hashes generated by the subset of the plurality of nodes, the first cryptographic hash configured to protect the first data against unauthorized modifications;

by the first node, determining that the first test script was executed properly on the subset of the plurality of nodes by comparing the cryptographic hashes generated by the subset of the plurality of nodes to each other;

transmitting the one or more first test script results to the second node in response to determining that the first test script was executed properly; and by the second node, verifying the one or more first test script results and transmitting a payment transaction to each node of the subset of the plurality of nodes in response to a successful verification of the one or more first test script results, wherein the payment transaction varies based on a type of the first test script executed.

7. The computer readable medium of claim 6, wherein the first node includes a referee node.

8. The computer readable medium of claim 6, wherein the first test script includes a Selenium script.

9. The computer readable medium of claim 6, wherein the subset of the plurality of nodes comprises edge devices.

10. The computer readable medium of claim 6, wherein the subset of the plurality of nodes is configured to execute software executable instructions to perform one or more functions of the first test script, wherein the software executable instructions include at least one of: a mobile application or an executable program.

11. The computer readable medium of claim 6, wherein method further comprises:
executing a second test script by each node in the subset of the plurality of nodes to generate one or more second test script results;
generating a second cryptographic hash of the blockchain for the one or more second test script results by performing one or more authorized modifications of second data of the blockchain, the blockchain including the second cryptographic hash configured to protect the data against unauthorized modifications; and by the first node, transmitting the second cryptographic hash to the second node; and by the second node, verifying the one or more second test script results based on the second cryptographic hash and a third cryptographic hash received from another node of the plurality of nodes that executed the second test script, the another node sharing one or more characteristics with at least the first node.

12. The method of claim 1 further comprising:
by the first node, receiving, from a third node, a request to execute a second test script by a fourth node selected for execution of the second test script based on one or more characteristics of the fourth node;
by the first node, receiving a second cryptographic hash from the fourth node, the second cryptographic hash generated in response to execution of the second test script;
by the first node, receiving a third cryptographic hash from another node of the plurality of nodes that executed the second test script, the another node sharing at least some characteristics with the fourth node;
by the first node, verifying one or more second test script results based on the second cryptographic hash and the third cryptographic hash; and
by the first node, transmitting the verification to the third node.

13. The method of claim 12 wherein one or more characteristics of the fourth node comprise at least one of: a location, a hardware characteristic, a software characteristic, a network characteristic, or a user characteristic.

14. The method of claim 5, wherein the one or more characteristics include at least one of a hardware characteristic, a software characteristic, or a network characteristic.

15. The method of claim 5, wherein the one or more characteristics include a user characteristic.

16. The computer readable medium of claim 11, wherein the one or more characteristics include at least one of a hardware characteristic, a software characteristic, or a network characteristic of the plurality of nodes.

17. The computer readable medium of claim 11, wherein the one or more characteristics include a user characteristic.

* * * * *